(12) United States Patent
Chen et al.

(10) Patent No.: US 6,834,288 B2
(45) Date of Patent: Dec. 21, 2004

(54) CONTENT-BASED SIMILARITY RETRIEVAL SYSTEM FOR IMAGE DATA

(75) Inventors: Jiann-Jone Chen, TaiChung (TW); Chen-Chin Chiang, Hualien (TW)

(73) Assignee: Industrial Technology Research Institute, Hsin-chu (TW)

( * ) Notice: Subject to any disclaimer, the term of this patent is extended or adjusted under 35 U.S.C. 154(b) by 138 days.

(21) Appl. No.: 09/833,818

(22) Filed: Apr. 13, 2001

(65) Prior Publication Data

US 2002/0178149 A1 Nov. 28, 2002

(51) Int. Cl.$^7$ ............................................. G06F 17/00
(52) U.S. Cl. ...................... 707/104.1; 707/2; 707/3; 382/305; 382/306; 382/307; 382/308; 382/190
(58) Field of Search ................ 707/104, 1, 2, 707/3; 382/190, 305, 306, 307, 308

(56) References Cited

U.S. PATENT DOCUMENTS

| | | | | |
|---|---|---|---|---|
| 5,579,471 A | * | 11/1996 | Barber et al. | 345/700 |
| 5,794,237 A | * | 8/1998 | Gore, Jr. | 707/5 |
| 5,819,288 A | * | 10/1998 | De Bonet | 707/2 |
| 5,893,905 A | * | 4/1999 | Main et al. | 705/11 |
| 5,911,139 A | * | 6/1999 | Jain et al. | 707/3 |
| 5,924,105 A | * | 7/1999 | Punch, III et al. | 715/513 |
| 5,963,670 A | * | 10/1999 | Lipson et al. | 382/224 |
| 5,987,457 A | * | 11/1999 | Ballard | 707/5 |
| 6,072,904 A | * | 6/2000 | Desai et al. | 382/225 |
| 2001/0003185 A1 | * | 6/2001 | Lee et al. | 707/102 |
| 2002/0174120 A1 | * | 11/2002 | Zang et al. | 707/7 |

OTHER PUBLICATIONS

Jiann–Jone Chen, Cheng–Yi Liu, Yea–Shuan Huang, Jun–Wei Hsieh: Similarity Retrieval in Image Database by Boosted Common Shape Features Among Query Images. IEEE Pacific Rim Conference on Mutimedia 2001: 285–292.*

* cited by examiner

Primary Examiner—Shahid Alam
Assistant Examiner—Chongshan Chen
(74) Attorney, Agent, or Firm—Intellectual Property Solutions, Incorporated

(57) ABSTRACT

An image retrieval system for retrieving image similarities from a database is proposed. The image retrieval system uses a universal query mechanism (UQM) to locate statistically silent common features among sample query images from different feature sets. The UQM also adjusts the weight factor for each feature to meet a user's query demand.

20 Claims, 8 Drawing Sheets

CONTENT-BASED SIMILARITY RETRIEVAL SYSTEM FOR IMAGE DATA

BACKGROUND OF THE INVENTION

1. Field of the Invention

The present invention is generally directed to image retrieval systems, and more particularly, to content-based retrieval of similar-looking images by employing multi-instance or relevance feedback to query images.

2. Description of the Related Art

The importance of content-based retrieval techniques for multimedia is assured in view of the widely used and distributed international coding standards, such as JPEG and MPEG, on the Internet. A particular multimedia content description interface, MPEG-7, is currently used to provide normal numerical descriptors for database search engine as matching criteria. For 2D shapes, MPEG-7 uses contour-based and region-based descriptors. Although describing shape contour by Fourier descriptors (FDs) can provide size, rotation and transition invariants for indexing, FDs are sensitive to noises and are more suitable for describing closed contour of shapes. For region-based descriptors, zernike and pseudo-zernike moments (ZMs and PZMs) are efficient features for retrieving similar shapes. Specific features such as edge orientation, aspect ratio, or complexity can be extracted for different databases and applications. Statistics, such as histogram or probability distribution model for the above-described features, are computed and considered as matching criteria for similarity measurement.

Shape descriptors have also been used to extract shape boundaries which are grouped into families on the basis of perceptual similarity. Visually salient feature is determined using probabilistic distribution model of trademarks in database and then trademarks with similar shape were retrieved according to this salient feature. A Multi-resolution description can be obtained by computing the mean and variance of each wavelet sub-band as to provide a concise description of the shape's texture and shape. Shape features as discussed above can also be brought up according to specific databases and user requirements. Although efficient in retrieving similar shapes for one application, one set of universal descriptors cannot satisfy all specific requirements. Indeed, one set of descriptors may perform well for one database but not the other, and each user may need specific combination of features for their specific retrieval target.

SUMMARY OF THE INVENTION

Accordingly, an object of the present invention is to provide a content-based retrieval method and apparatus which retrieves statistically salient common features among sample query images having different feature sets.

It is another object of the present invention to update sample query images by multi-instance or relevance feedback.

It is still another object of the present invention to provide a universal query mechanism (UQM) or process that is plural and flexible in selecting proper features as to meet a user's intent or requirement.

These and other objects of the present invention are achieved by providing a content-based retrieval method and apparatus which finds the most common features among each set of sample query images from multi-instance or relevance feedback. In particular, each set of sample query images is constructed by finding similar images shapes in the database. The resulting sample query images are statistically similar to query input, i.e. relative instead of absolute similarity. A probability distribution model for the feature vectors is used to dynamically adjust weights such that most common ones among sample query images dominates feedback query. Whenever new feature sets are devised, they could be acquired by the query system. The query unit then searches from all feature sets such that the statistically common features become the new query vector. Accordingly, the UQM accommodates new feature sets easily and adjusts weights for various features dynamically according to a user's query and statistics of the database.

For similarity retrieval, each user has his definition for shape similarity and no one universal set of shape descriptors could satisfy all specific requirements. Usually, the indexing system provides relevance feedback to learn what user's intention is and generating a new feature vector for next query. Instead of using mean of feature vectors (MFV) from sample query images as the new query vector, the UQM of the present invention finds statistically salient common features among sample query images with different feature sets.

Related aspects and advantages of the invention will become apparent and more readily appreciated from the following detailed description of the invention, taken in conjunction with the accompanying drawings.

DETAILED DESCRIPTION OF THE INVENTION

The present invention will now be described by way of preferred embodiments with references to the accompanying drawings. Like numerals refer to corresponding parts of various drawings.

Figure 1:
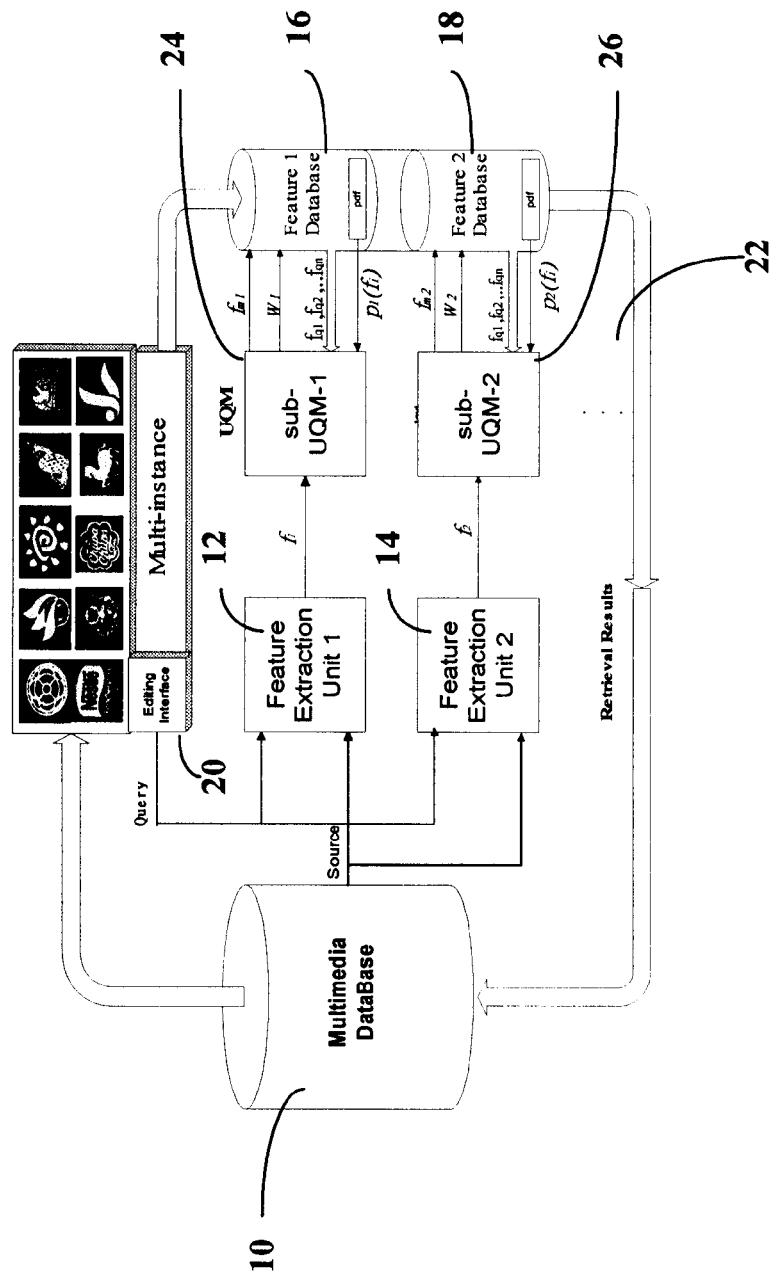
FIG. 1 is a schematic diagram showing a content-based retrieval method according to a preferred embodiment of the present invention.

One embodiment of content-based similarity retrieval process for database images is shown in FIG. 1. During the first phase, common features of multimedia content in a multimedia database are extracted by feature extraction units 12 and 14 and stored in feature databases 16 and 18. In the second phase (i.e., similarity retrieval), a user selects an initial query image either through an on-line editing interface 20 or from one or more sample images stored in the database 10. If a new image is created from the on-line interface 20, features in the new image must be extracted by both feature extraction units 12 and 14 before searching in the feature databases 16 and 18. If one of the sample images stored in the database 10 were used as the initial query image, then only an identification code will be sent to the feature databases 16 and 18, which sends associated feature of the initial query image to a UQM 22 such that both query units 24 and 26 in the UQM can generate a representative feature vector for retrieving a set of sample query images.

Since more than one feature set may be created and new features can be plugged into the UQM based on a user's requirement, statistically common features are retrieved among sample query images through multi-instance or by relevance feedback. The weight factor for each feature is adjusted by UQM to meet a user's query requirement. The query results are the same when non-related features are involved or excluded in the retrieval process.

Assume n feature sets are created, then the feature vector for sample s can be represented as $\vec{F}_s=(\vec{f}_1, \vec{f}_2, \ldots, \vec{f}_n)$, where the i-th feature set is $\vec{f}_i=(f_{i1}, f_{i2}, \ldots f_{iN_i})$. Let $\vec{N}_t=\{ij|i=1,\ldots,n, j=1,\ldots,N_i\}$, and the feature vector can be represented as $\vec{F}_s=\{f_k|k\in\vec{N}_t\}$. Let the probability distribution function of feature $f_i$ be $p(f_i)$, then the probability density function $P(f)$ would be:

$$P(f) = \int_0^f p(f_i) df_i \qquad (1)$$

Figure 2:
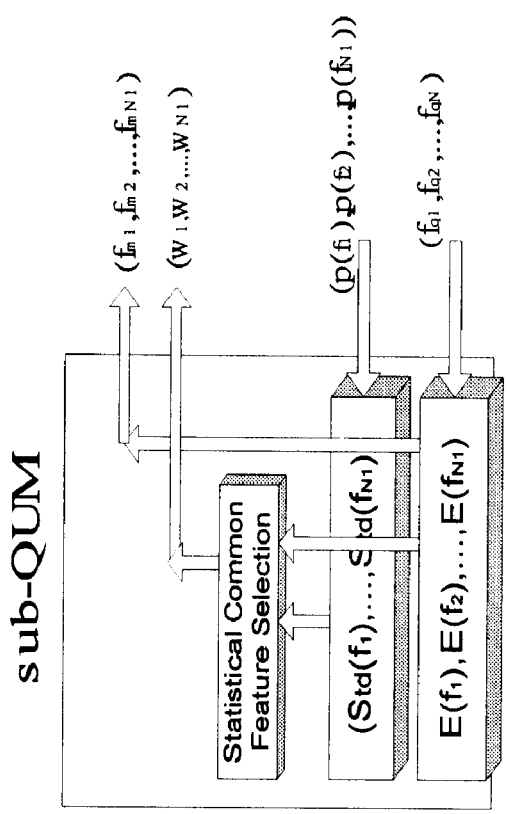
FIG. 2 is a schematic diagram showing a UQM according to the preferred embodiment of the present invention.

Through multi-instance or relevance feedback, the UQM as shown in FIG. 2 seeks to find common features among sample query images. Weight factors are adjusted such that statistically common features dominate in the representative feature vector for next sample query images. Let there be q sample query images, either for multi-instance or relevance feedback, and the q feature vectors available are $\vec{F}_s$ where $s=1,\ldots,q$. Mean and variance of these vectors could be represented as:

$$\{m_j\}_{\bar{N}_t} = E[\vec{F}_s] = \{E[f_j]\}_{j\in\bar{N}_t} = \{E\{f_{ij} \mid i=1,\ldots,q\}\}_{j\in\bar{N}_t} \qquad (2)$$

and $$\{\sigma_j^2\}_{\bar{N}_t} = \{E[(f_j-m_j)^2]\}_{j\in\bar{N}_t} = \{E\{f_{ij}^2 \mid i=1,\ldots,q\} - m_j^2\}_{j\in\bar{N}_t}. \qquad (3)$$

Figure 3:
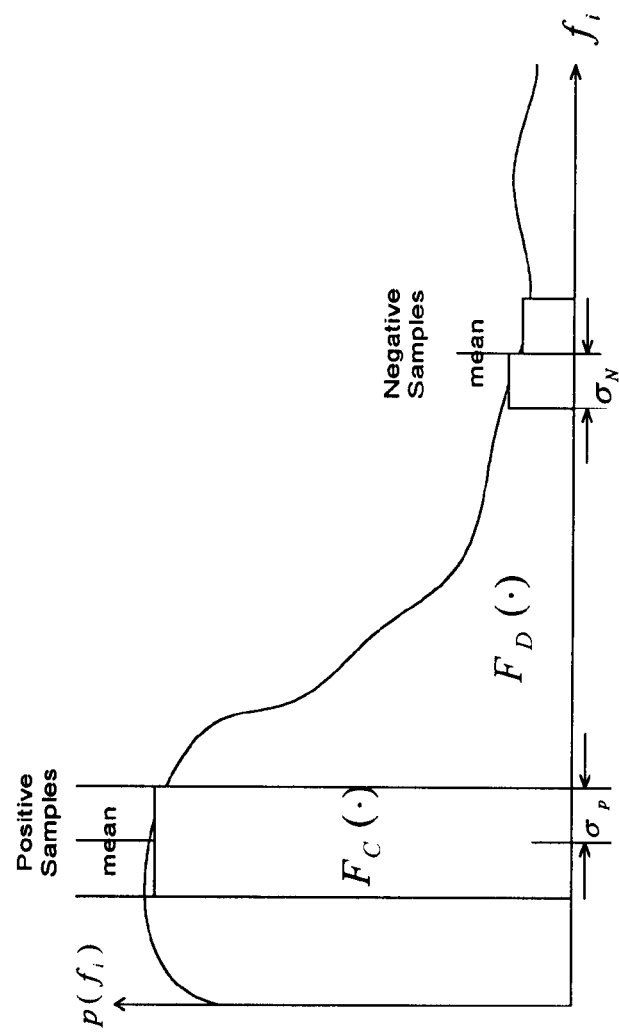
FIG. 3 is a schematic chart showing the measurement of feature saliency.

For similarity measurement in statistics as shown in FIG. 3, positive and negative feedback samples are provided and feature compactness $F_C(\bullet)$ and feature diversity $F_D(\bullet)$ in probability are defined as:

$$F_C(m,\sigma)=P(m+\sigma)-P(m-\sigma); \text{ and} \qquad (4)$$

$$F_D(m_1,\sigma_1,m_2,\sigma_2)=P(m_2-\sigma_2)-P(m_1+\sigma_1). \qquad (5)$$

$F_D(\bullet)=1$ is set so that if the number of negative feedback samples is zero. The weight, $w_j$, of j-th feature, $f_j$, for the next query are adjusted according to the following relation:

$$\omega_j \cong \frac{F_D(m_j^P, \sigma_j^P, m_j^N, \sigma_j^N)}{F_C(m_j^P, \sigma_j^P) \cdot F_C(m_j^N, \sigma_j^N)} \qquad (6)$$

For one feature, say j-th feature, which is statistically similar among query sample images, it would yield a smaller $F_C(\bullet)$, and this feature would get high credit because of larger $w_j$ is assigned. Whenever new feature sets are created, statistically common features among all feature sets would dominate the query process no matter how many feature sets are specified. In short, feature sets could be integrated or excluded from the query according to a user's requirement without affecting query results, i.e., only statistically similar features dominate the query.

For applications that provide positive and negative samples, the query unit intends to enhance a positive feature while excluding the negative ones. Since $F_D(m_j^P,\sigma_j^P,m_j^N,\sigma_j^N)$ evaluates the depletion region between features to be discriminated, features to be excluded needs not be statistically common hence the following is set: $F_C(m_j^N,\sigma_j^N)=1$. In addition, to make common features dominate and to exclude unrelated features, the following is set: $W_j=1$ when the ratio in equation (6) is larger than a predefined threshold and 0 for others.

In short, the control steps of the invention are summarized as follows:

(1) the feature vector $(f_1,f_2,\ldots,f_N)$ is extracted for each sample image in the database;

(2) the probability distribution function is computed and stored for each feature either by $\{(m_i,\sigma_i)\}_{i=1,\ldots,N}$ or $\{p(f_{ij})|j=1,\ldots,M\}_{i=1,\ldots,N}$;

(3) for each query, compute mean (m) and standard deviation ($\sigma$) for each feature among query image;

(4) find the feature commonality for each feature i.e., $F_C(m,\sigma)=P(m+\sigma)-P(m-\sigma)$ and generate new weight by the following condition: if$(F_c<P_T)$ $\omega_i=1$ else $\omega_i=0$; and (5) perform new retrieval by new feature vector $(m_1, m_2,\ldots,m_N)$ and new weight vector $(\omega_1,\omega_2,\ldots,\omega_N)$.

Statistical characteristics of features in the database are exploited for similarity retrieval. In cases that most feature values of the same family diverse while they are similar in probability space, the retrieval results may not converge from human perception. It happens when there are very few similar images in the database or too many noises in the images. For this, $w_i=0$ is set to keep the common feature dominating the query process when $$\sigma_i^c > \frac{1}{c} \cdot \sigma_i^s,$$

where $\sigma_i^c$ and $\sigma_i^c$ are standard deviation of ith features from relevant and all database samples, respectively.

Results of the content-based retrieval method according to a preferred embodiment of the present invention are shown in FIGS. 4 and 5. Thirty thousand registered Taiwan trademarks were collected from Taiwan Bell Trademark Company. They contain text pattern, animal, regular geometrical shape and shapes with text et al. These shape patterns were segmented manually from scanned documents in JPEG format. Each one is pre-processed by locating MBC of shapes before further feature extraction. For efficient feature extraction, magnitude of ZM and PZM were computed for each sample by the lookup-table method with order, n, up to ten. The numbers of ZM and PZM are 36 and 66, respectively.

Figure 4A:
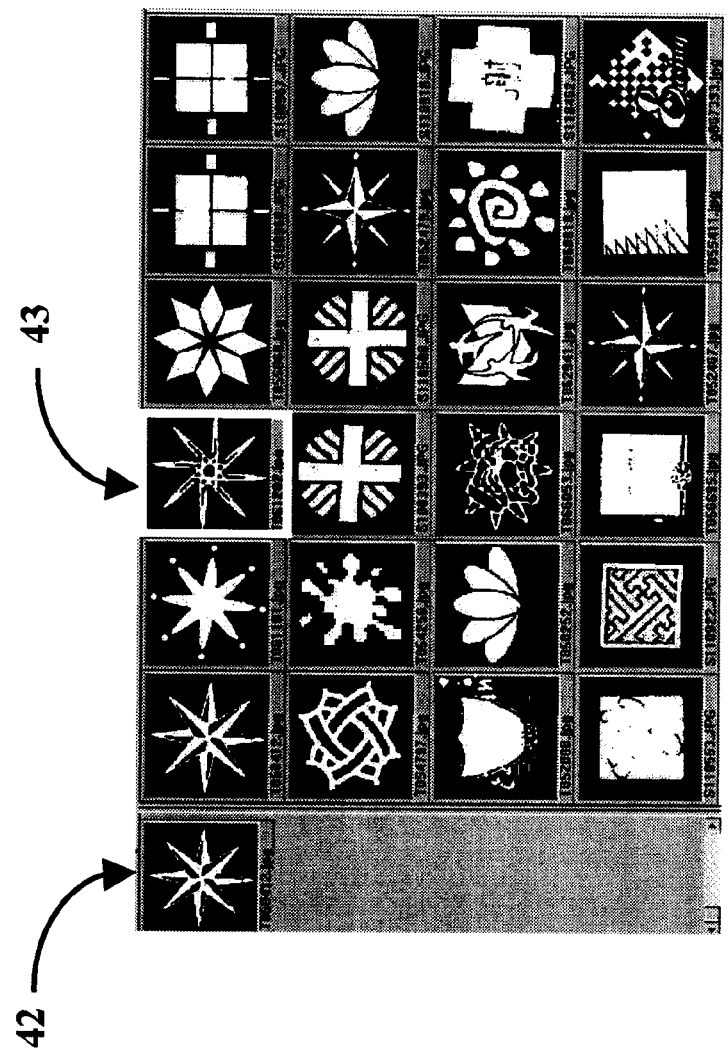
FIGS. 4A–C and 5A–B show results of the content-based retrieval method according to a preferred embodiment of the present invention
Figure 4B:
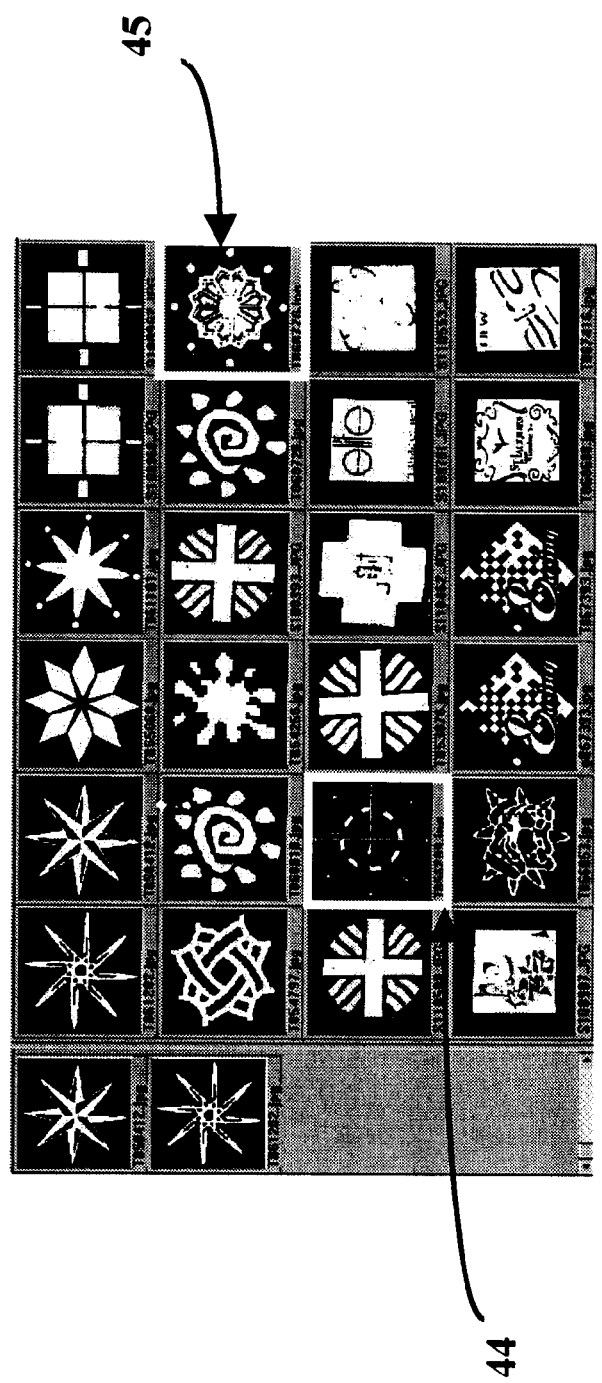
Figure 4C:
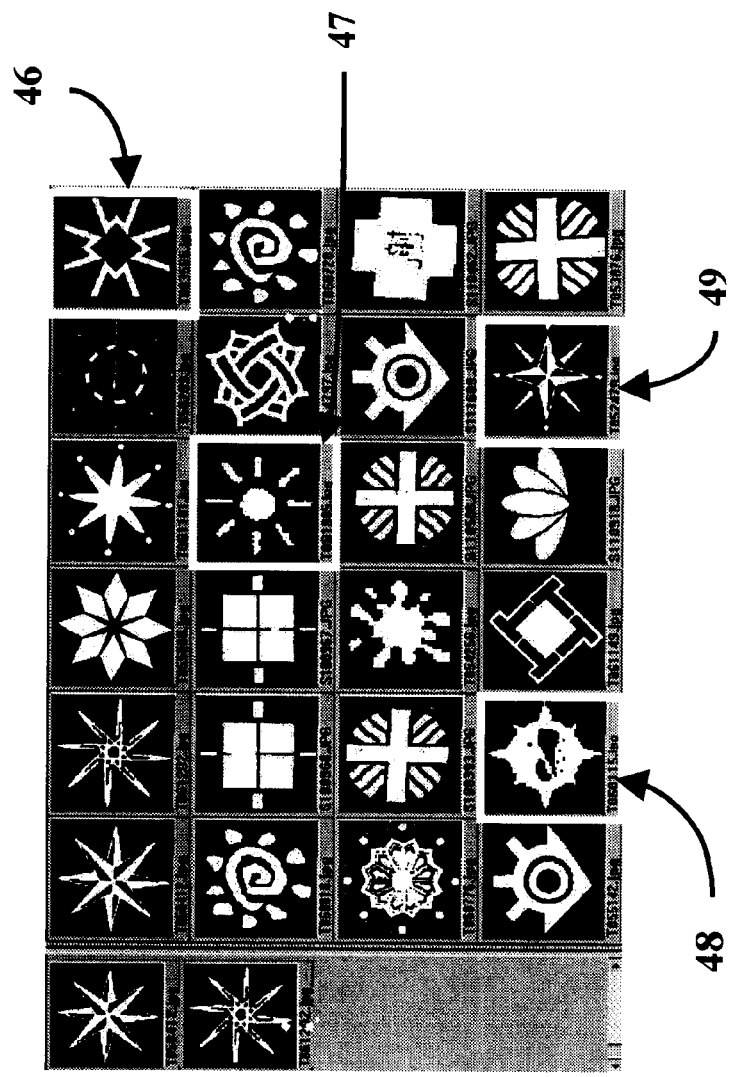

FIG. 4A is the retrieval results by one query image 42. Image 43 is selected as the relevance feedback for the next retrieval. Mean of feature vectors of the two instances (images 42 and 43) is first used as the input for the second query. FIG. 4B shows the second query results and two visually similar shapes, i.e., images 44 and 45, other than those in FIG. 4A, are retrieved if features were not weighted by the UQM method. In FIG. 4C, three more similar shapes in images 46, 47 and 48 are retrieved when the proposed UQM are used.

Figure 5A:
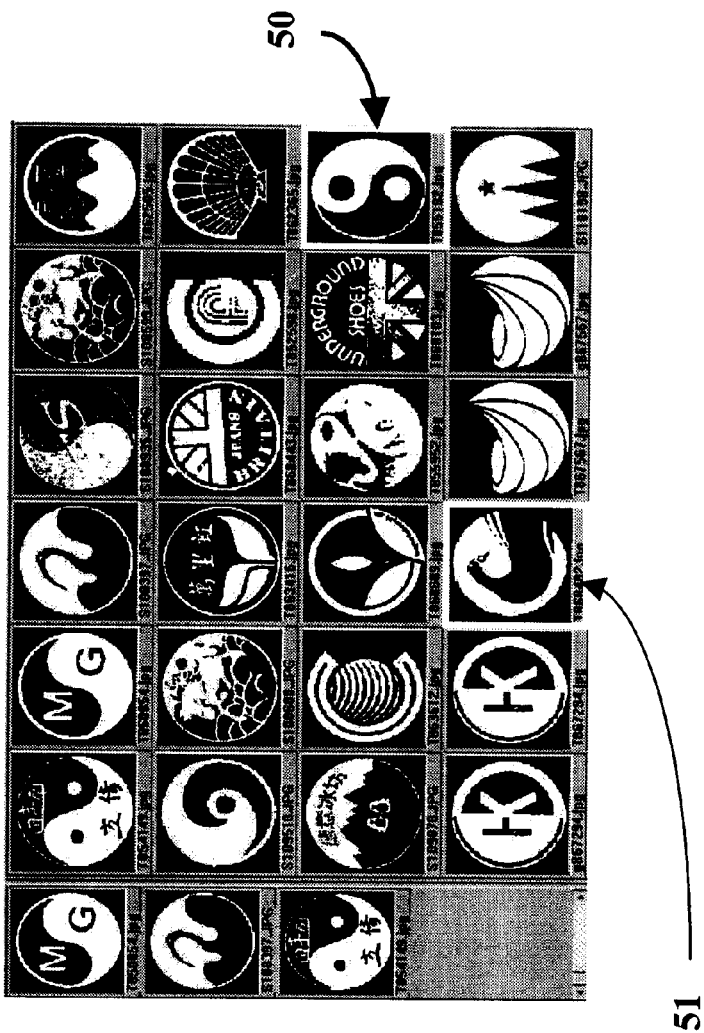
Figure 5B:

Another retrieval results of query by three-instances are demonstrated in FIGS. 5A and 5B. In FIG. 5A, the proposed UQM searches out two more visually similar images 50 and 51 that are not presented in FIG. 5B in which features are not weighted by UQM.

The invention may be embodied in other specific forms without departing from the spirit or essential characteristics thereof. Scope on the invention is thus indicated by the claims rather than by the forgoing description, and all changes which come within the meanings and range of equivalency of the claims are therefore intended to be embraced herein.

What is claimed is:

1. A content-based retrieval method for retrieving one or more images from a multimedia database, the retrieval method tangibly embodied in a computer-readable medium, comprising the steps of:

constructing a nonempty sample query image set, said sample query image set consisting of two disjoint subsets, designated as positive sample subset and negative sample subset, wherein said positive sample subset is nonempty and said negative sample subset may be empty;

extracting a salient and common feature vector from said sample query image set;

generating an adjusted weight factor based on said salient and common feature vector;

calculating a mean value for the negative sample subset and a mean value for the positive sample subset, and calculating a standard deviation for the negative sample subset and a standard deviation for the positive sample subset, wherein, if the mean value of the negative sample subset is greater than the mean value of the positive sample subset, then said adjusted weight factor is proportional to a difference between a first term and a second term, wherein said first term is proportional to a cumulative probability of the mean value for said negative sample subset minus the standard deviation for said negative sample subset, and said second term is proportional to a cumulative probability of the mean value of said positive sample subset plus the standard deviation of said positive sample subset, and if the mean value of the positive sample subset is greater than the mean value of the negative sample subset, then said adjusted weight factor is proportional to a difference between a third term and a fourth term, wherein said third term is proportional to a cumulative probability of the mean value for said positive sample subset minus the standard deviation for said positive sample subset, and said fourth term is proportional to a cumulative probability of the mean value for said negative sample subset plus the standard deviation of said negative sample subset, and wherein said adjusted weight factor is inversely proportional to a product of a fifth term and a sixth term, wherein said fifth term is proportional to a difference between a cumulative probability of the mean value for said positive sample subset plus the standard deviation of said positive sample subset and a cumulative probability of the mean value for said positive sample subset minus the standard deviation of said positive sample subset, and said sixth term is proportional to a difference between a cumulative probability of the mean value for said negative sample subset plus the standard deviation of said negative sample subset and a cumulative probability of the mean value for said negative sample subset minus the standard deviation of said negative sample subset, wherein the difference between said first and said second terms and the difference between said third and said fourth terms may be set equal to zero if their calculations yield a negative result or are below a first predetermined threshold, or set to unity if their calculations are above a second predetermined threshold or if said negative sample set is empty, and wherein said sixth term may be set equal to unity if said negative sample subset is nonempty;

generating a new feature vector based on said adjusted weight factor; and retrieving a new query image based on said new feature vector.

2. The content-based retrieval method of claim 1, wherein said step of extracting salient and common feature vector comprises:

extracting a representative feature vector for each of said sample query images; and computing and storing a probability distribution function, a mean value and a variance value for said representative feature vector.

3. The image retrieval method of claim 2, wherein said mean value and said variance value are respectively represented by:

$$\{m_j\}_{\bar{N}_t} = E[\vec{F}_s] = \{E[f_j]\}_{j \in \bar{N}_t} = \{E\{f_{ij} \mid i=1,\ldots,q\}\}_{j \in \bar{N}_t}, \text{ and}$$

$$\{\sigma_j^2\}_{\bar{N}_t} = \{E[(f_j - m_j)^2]\}_{j \in \bar{N}_t} = \{E\{f_{ij}^2 \mid i=1,\ldots,q\} - m_j^2\}_{j \in \bar{N}_t},$$

wherein $N^t = \{ij \equiv i=1,2,\ldots n; j=1,2,\ldots N_i\}$, n is the number of feature sets, and $N_i$ is the number of features in the $j^{th}$ feature set.

4. The content-based image retrieval method of claim 2, wherein said probability distribution function is represented by:

$$\{(m_i, \sigma_i)\}_{i=1,\ldots,N} \text{ or } \{p(f_{ij}) | j=1,\ldots,M\}_{i=1,\ldots,N}.$$

5. The content-based image retrieval method of claim 4, wherein said adjusted weight factor $\omega_j$ is given by:

$$\omega_j \cong \frac{F_D(m_j^P, \sigma_j^P, m_j^N, \sigma_j^N)}{F_C(m_j^P, \sigma_j^P) \cdot F_C(m_j^N, \sigma_j^N)}, \text{ and}$$

said salient and common feature vector is measured by:

$$F_C(m, \sigma) = P(m+\sigma) - P(m-\sigma)$$

wherein $P(m+\sigma)$ and $P(m-\sigma)$ denote cumulative probability distributions, and $$F_D(m_j^P, \sigma_j^P, m_j^N, \sigma_j^N) = P(m_j^N - \sigma_j^N) - P(m_j^P + \sigma_j^P), \text{ if } m_j^N > m_j^P$$

$$F_D(m_j^P, \sigma_j^P, m_j^N, \sigma_j^N) = P(m_j^N - \sigma_j^N) - P(m_j^P + \sigma_j^P), \text{ if } m_j^N > m_j^P$$

and if $F_D(m_j^P, \sigma_j^P, m_j^N, \sigma_j^N) < 0$ then $F_D(m_j^P, \sigma_j^P, m_j^N, \sigma_j^N) = 0$, and wherein $m_j^P$ indicates mean value of feature j among positive feedback images, $m_j^N$ indicates mean value of feature j among negative feedback images, $\sigma_j^P$ is standard deviation of feature j calculated among positive feedback images, and $\sigma_j^N$ is standard deviation of feature j calculated among negative feedback images.

6. The content-based image retrieval method of claim 5, wherein said adjusted weight factor is generated according to:

$$if(F_C < P_T) \omega_i = 1 \text{ else } \omega_i = 0.$$

wherein PT denotes a predefined threshold number.

7. A content-based retrieval method for retrieving one or more images from a multimedia database, the retrieval method tangibly embodied in a computer-readable medium, comprising the steps of:

inputting a nonempty sample query image set by a user, said sample query image set consisting of two disjoint subsets, designated as positive sample subset and negative sample subset, wherein said positive sample subset is nonempty and said negative sample subset may be empty;

extracting feature vectors for said initial query images based on one or more requirements of said user;

extracting salient and common features based on said feature vectors;

generating adjusted weight factors based on said salient and common features;

calculating a mean value for the negative sample subset and a mean value for the positive sample subset, and calculating a standard deviation for the negative sample subset and a standard deviation for the positive sample subset, wherein, if the mean value of the negative sample subset is greater than the mean value of the positive sample subset, then said adjusted weight factor is proportional to the a difference between a first term and a second term, wherein said first term is proportional to a cumulative probability of the mean value for said negative sample subset minus the standard deviation for said negative sample subset, and said second term is proportional to a cumulative probability of the mean value of said positive sample subset plus the standard deviation of said positive sample subset, and if the mean value of the positive sample subset is greater than the mean value of the negative sample subset, then said adjusted weight factor is proportional to a difference between a third term and a fourth term, wherein said third term is proportional to a cumulative probability of the mean value for said positive sample subset minus the standard deviation for said positive sample subset, and said fourth term is proportional to a cumulative probability of the mean value for said negative sample subset plus the standard deviation of said negative sample subset, and wherein said adjusted weight factor is inversely proportional to the a product of a fifth term and a sixth term, wherein said fifth term is proportional to a difference between a cumulative probability of the mean value for said positive sample subset plus the standard deviation of said positive sample subset and a cumulative probability of the mean value for said positive sample subset minus the standard deviation of said positive sample subset, and said sixth term is proportional to a difference between a cumulative probability of the mean value for said negative sample subset plus the standard deviation of said negative sample subset and a cumulative probability of the mean value for said negative sample subset minus the standard deviation of said negative sample subset, wherein the difference between said first and said second terms and the difference between said third and said fourth terms may be set equal to zero if their calculations yield a negative result or are below a first predetermined threshold, or set to unity if their calculations are above a second predetermined threshold or if said negative sample set is empty, and wherein said sixth term may be set equal to unity if said negative sample subset is nonempty;

generating new feature vectors based on said adjusted weight factors; and retrieving new query images based on said new feature vectors.

8. The content-based retrieval method of claim 7, wherein said extracted feature vectors are stored in one or more feature databases.

9. The content-based retrieval method of claim 7, wherein said step of extracting said salient and common feature vectors comprises:

extracting a representative feature vector for each of said sample query images; and computing and storing a probability distribution function, a mean value and a variance for said representative feature vector.

10. The content-based image retrieval method of claim 9, wherein said mean value and said variance value are respectively represented by:

$$\{m_j\}_{\bar{N}_t} = E[\vec{F}_s] = \{E[f_j]\}_{j \in \bar{N}_t} = \{E\{f_{ij} \mid i=1,\ldots,q\}\}_{j \in \bar{N}_t}, \text{ and}$$

$$\{\sigma_j^2\}_{\bar{N}_t} = \{E[(f_j - m_j)^2]\}_{j \in \bar{N}_t} = \{E\{f_{ij}^2 \mid i=1,\ldots,q\} - m_j^2\}_{j \in \bar{N}_t},$$

wherein
$N_t = \{ij \equiv i=1,2,\ldots n; j=1,2,\ldots N_i\}$, n is the number of feature sets, and $N_i$ is the number of features in the $j^{th}$ feature set.

11. The content-based image retrieval method of claim 9, wherein said probability distribution function is represented by:

$$\{(m_i, \sigma_i)\}_{i=1,\ldots,N} \text{ or } \{p(f_{ij}) | j=1,\ldots,M\}_{i=1,\ldots,N}.$$

12. The content-based image retrieval method of claim 11, wherein said adjusted weight factor $\omega_j$ is given by:

$$\omega_j \cong \frac{F_D(m_j^P, \sigma_j^P, m_j^N, \sigma_j^N)}{F_C(m_j^P, \sigma_j^P) \cdot F_C(m_j^N, \sigma_j^N)}, \text{ and}$$

said salient and common feature vector is measured by:

$$F_C(m, \sigma) = P(m+\sigma) - P(m-\sigma).$$

wherein $P(m+\sigma)$ and $P(m+\sigma)$ denote cumulative probability distributions, and $$F_D(m_j^P, \sigma_j^P, m_j^N, \sigma_j^N) = P(m_j^N - \sigma_j^N) - P(m_j^P + \sigma_j^P), \text{ if } m_j^N > m_j^P$$

$$F_D(m_j^P, \sigma_j^P, m_j^N, \sigma_j^N) = P(m_j^N - \sigma_j^N) - P(m_j^P + \sigma_j^P), \text{ if } m_j^N > m_j^P$$

and if $F_D(m_j^P, \sigma_j^P, m_j^N, \sigma_j^N) < 0$ then $F_D(m_j^P, \sigma_j^P, m_j^N, \sigma_j^P) = 0$, and wherein $m_j^P$ indicates mean value of feature j among positive feedback images, $m_j^N$ indicates mean value of feature j among negative feedback images, $\sigma_j^P$ is standard deviation of feature j calculated among positive feedback images, and $\sigma_j^N$ is standard deviation of feature j calculated among negative feedback images.

13. The content-based image retrieval method of claim 12, wherein said adjusted weight factor is generated according to:

$$if (F_c < P_T) \omega_j = 1 \text{ else } \omega_j = 0.$$

wherein $P_T$ denotes a predefined threshold number.

14. A content-based retrieval method for retrieving one or more images from a multimedia database, the retrieval method tangibly embodied in a computer-readable medium, comprising the steps of:

selecting a nonempty sample query image set from said database, said sample query image set consisting of two disjoint subsets, designated as positive sample subset and negative sample subset, wherein said positive sample subset is nonempty and said negative sample subset may be empty;

retrieving corresponding feature vectors for said initial query images;

extracting salient and common features based on said feature vectors; generating new weighting factors based on said salient and common features;

calculating a mean value for the negative sample subset and a mean value for the positive sample subset, and calculating a standard deviation for the negative sample subset and a standard deviation for the positive sample subset, wherein, if the mean value of the negative sample subset is greater than the mean value of the positive sample subset, then said adjusted weight factor is proportional to a difference between a first term and a second term, wherein said first term is proportional to a cumulative probability of the mean value for said negative sample subset minus the standard deviation for said negative sample subset, and said second term is proportional to a cumulative probability of the mean value of said positive sample subset plus the standard deviation of said positive sample subset, and if the mean value of the positive sample subset is greater than the mean value of the negative sample subset, then said adjusted weight factor is proportional to a difference between a third term and a fourth term, wherein said third term is proportional to a cumulative probability of the mean value for said positive sample subset minus the standard deviation for said positive sample subset, and said fourth term is proportional to a cumulative probability of the mean value for said negative sample subset plus the standard deviation of said negative sample subset, and wherein said adjusted weight factor is inversely proportional to a product of a fifth term and a sixth term, wherein said fifth term is proportional to a difference between a cumulative probability of the mean value for said positive sample subset plus the standard deviation of said positive sample subset and a cumulative probability of the mean value for said positive sample subset minus the standard deviation of said positive sample subset, and said sixth term is proportional to a difference between a cumulative probability of the mean value for said negative sample subset plus the standard deviation of said negative sample subset and a cumulative probability of the mean value for said negative sample subset minus the standard deviation of said negative sample subset, wherein the difference between said first and said second terms and the difference between said third and said fourth terms may be set equal to zero if their calculations yield a negative result or are below a first predetermined threshold, or set to unity if their calculations are above a second predetermined threshold or if said negative sample set is empty, and wherein said sixth term may be set equal to unity if said negative sample subset is nonempty;

generating new feature vectors based on said new weighting factors; and retrieving new query images based on said new feature vectors.

15. The content-based retrieval method of claim 14, wherein said step of extracting salient and common feature vectors comprises:

extracting a representative feature vector for each of said sample query images; and computing and storing a probability distribution function, a mean value and a variance value for said representative feature vector.

16. The image retrieval method of claim 15, wherein said mean value and said variance value are respectively represented by:

$$\{m_j\}_{\bar{N}_t} = E[\vec{F}_s] = \{E[f_j]\}_{j \in \bar{N}_t} = \{E\{f_{ij} \mid i=1, \ldots, q\}\}_{j \in \bar{N}_t}, \text{ and}$$

$$\{\sigma_j^2\}_{\bar{N}_t} = \{E[(f_j - m_j)^2]\}_{j \in \bar{N}_t} = \{E\{f_{ij}^2 \mid i=1, \ldots, q\} - m_j^2\}_{j \in \bar{N}_t},$$

wherein $N_t = \{ij \mid i=1,2, \ldots n; j=1,2, \ldots N)_i\}$, n is the number of feature sets, and $N_i$ is the number of features in the $j^{th}$ feature set.

17. The content-based image retrieval method of claim 15, wherein said probability distribution function is represented by:

$$\{(m_i, \sigma_i)\}_{i=1, \ldots, N} \text{ or } \{p(f_{ij}) \mid j=1, \ldots, M\}_{i=1, \ldots, N}.$$

18. The content-based image retrieval method of claim 17, wherein said adjusted weight factor $\omega_j$ is given by:

$$\omega_j \cong \frac{F_D(m_j^P, \sigma_j^P, m_j^N, \sigma_j^N)}{F_C(m_j^P, \sigma_j^P) \cdot F_C(m_j^N, \sigma_j^N)}, \text{ and}$$

said salient and common feature vector is measured by:

$$F_C(m, \sigma) = P(m+\sigma) - P(m-\sigma).$$

wherein $P(m+\sigma)$ and $P(m-\sigma)$ denotes denote cumulative probability distributions, and $$F_D(m_j^P, \sigma_j^P, m_j^N, \sigma_j^P) = P(m_j^N - \sigma_j^N) - P(m_j^P + \sigma_j^P), \text{ if } m_j^N > m_j^P$$

$$F_D(m_j^P, \sigma_j^P, m_j^N, \sigma_j^P) = P(m_j^N - \sigma_j^N) - P(m_j^P + \sigma_j^P), \text{ if } m_j^N > m_j^P$$

and if $F_D(m_j^P, \sigma_j^P, m_j^N, \sigma_j^P) < 0$ then $F_D(m_j^P, \sigma_j^P, m_j^N, \sigma_j^P) = 0$, and wherein $m_j^P$ indicates mean value of feature j among positive feedback images, $m_j^N$ indicates mean value of feature j among negative feedback images, $\sigma_j^P$ is standard deviation of feature j calculated among positive feedback images, and $\sigma_j^N$ is standard deviation of feature j calculated among negative feedback images.

19. The content-based image retrieval method of claim 18, wherein said adjusted weight factor is generated according to:

$$if(F_C < P_T) \omega_i = 1 \text{ else } \omega_i = 0.$$

wherein PT denotes a predefined threshold number.

20. A content-based retrieval apparatus for retrieving one or more images from a multimedia database, comprising:

a multimedia database for storing a nonempty sample query image set, said sample query image set consisting of two disjoint subsets, designated as positive sample subset and negative sample subset, wherein said positive sample subset is nonempty and said negative sample subset may be empty;

one or more feature extraction unit for extracting salient and common feature vectors from said sample query images;

one or more feature databases for storing said salient and common feature vectors;

one or more universal query units for generating adjusted weight factors based on said salient and common feature vectors, generating new feature vectors based on said adjusted weight factors, and generating new query images based on said new feature vectors;

one or more calculation units for calculating a mean value for the negative sample subset and a mean value for the positive sample subset, and one or more calculation units for calculating a standard deviation for the negative sample subset and a standard deviation for the positive sample subset, wherein, if the mean value of the negative sample subset is greater than the mean value of the positive sample subset, then said adjusted weight factor is proportional to a difference between a first term and a second term, wherein said first term is proportional to a cumulative probability of the mean value for said negative sample subset minus the standard deviation for said negative sample subset, and said second term is proportional to a cumulative probability of the mean value of said positive sample subset plus the standard deviation of said positive sample subset, and if the mean value of the positive sample subset is greater than the mean value of the negative sample subset, then said adjusted weight factor is proportional to a difference between a third term and a fourth term, wherein said third term is proportional to the cumulative a cumulative probability of the mean value for said positive sample subset minus the standard deviation for said positive sample subset, and said fourth term is proportional to the cumulative a cumulative probability of the mean value for said negative sample subset plus the standard deviation of said negative sample subset, and wherein said adjusted weight factor is inversely proportional to the a product of a fifth term and a sixth term, wherein said fifth term is proportional to a difference between a cumulative probability of the mean value for said positive sample subset plus the standard deviation of said positive sample subset and a cumulative probability of the mean value for said positive sample subset minus the standard deviation of said positive sample subset, and said sixth term is proportional to a difference between a cumulative probability of the mean value for said negative sample subset plus the standard deviation of said negative sample subset and a cumulative probability of the mean value for said negative sample subset minus the standard deviation of said negative sample subset, wherein the difference between said first and said second terms and the difference between said third and said fourth terms may be set equal to zero if their calculations yield a negative result or are below a first predetermined threshold, or set to unity if their calculations are above a second predetermined threshold or if said negative sample set is empty, and wherein said sixth term may be set equal to unity if said negative sample subset is nonempty, one or more generation units for generating a new feature vector based on said adjusted weight factor; and one or more retrieval units for retrieving a new query image based on said new feature vector.

* * * * *